United States Patent
Bowers

(10) Patent No.: US 11,471,968 B2
(45) Date of Patent: Oct. 18, 2022

(54) WELDING SUPPORT BLOCK

(71) Applicant: Saipem S.p.A., Milanese (IT)

(72) Inventor: Jonathan Bowers, Hull (GB)

(73) Assignee: SAIPEM S.P.A., Milanese (IT)

(*) Notice: Subject to any disclaimer, the term of this patent is extended or adjusted under 35 U.S.C. 154(b) by 569 days.

(21) Appl. No.: 16/477,592

(22) PCT Filed: Jan. 15, 2018

(86) PCT No.: PCT/EP2018/050893
§ 371 (c)(1),
(2) Date: Jul. 12, 2019

(87) PCT Pub. No.: WO2018/130695
PCT Pub. Date: Jul. 19, 2018

(65) Prior Publication Data
US 2020/0122259 A1    Apr. 23, 2020

(30) Foreign Application Priority Data

Jan. 16, 2017  (GB) .................................. 1700735

(51) Int. Cl.
*B23K 9/028* (2006.01)
*B23K 9/035* (2006.01)
(Continued)

(52) U.S. Cl.
CPC ............ *B23K 9/028* (2013.01); *B23K 9/0286* (2013.01); *B23K 9/035* (2013.01);
(Continued)

(58) Field of Classification Search
CPC ...... B23K 9/028; B23K 9/0286; B23K 9/035; B23K 37/0276; B23K 37/0435;
(Continued)

(56) References Cited

U.S. PATENT DOCUMENTS 2,362,505 A   11/1944  Smith
3,372,852 A   3/1968   Lew
(Continued)

FOREIGN PATENT DOCUMENTS

DE       19725437 A1    12/1998
DE    102009038433 A1     2/2011
(Continued)

OTHER PUBLICATIONS

GB Search Report dated May 23, 2017.
(Continued)

*Primary Examiner* — Brian W Jennison
(74) *Attorney, Agent, or Firm* — Buchanan Ingersoll & Rooney PC

(57) ABSTRACT

A welding support block supports, from the rear surface of a joint to be welded, a weld pool created during a welding process. The welding support block comprises a block of metal and an outer layer of ceramic material providing a supporting surface. The ceramic material layer has a thickness between 0.25 mm and 1.5 mm. The metal material immediately beneath the ceramic material layer is made of steel. An internal line-up clamp for holding pipes in end-to-end alignment ready for welding may include multiple such welding support blocks. The use of such welding support blocks is particularly useful when laying a sour service carrying pipeline (high $H_2S$ content).

17 Claims, 7 Drawing Sheets

(51) Int. Cl.
  *B23K 37/02* (2006.01)
  *B23K 37/04* (2006.01)
  *B23K 37/053* (2006.01)
  *B23K 37/06* (2006.01)
  *B23K 101/06* (2006.01)
  *B23K 101/10* (2006.01)
  *B23K 103/02* (2006.01)

(52) U.S. Cl.
  CPC ...... *B23K 37/0276* (2013.01); *B23K 37/0435* (2013.01); *B23K 37/0461* (2013.01); *B23K 37/0531* (2013.01); *B23K 37/06* (2013.01); *B23K 2101/06* (2018.08); *B23K 2101/10* (2018.08); *B23K 2103/02* (2018.08)

(58) Field of Classification Search
  CPC ............ B23K 37/0461; B23K 37/0531; B23K 37/06; B23K 2101/06; B23K 2101/10; B23K 2103/02
  See application file for complete search history.

(56) References Cited

U.S. PATENT DOCUMENTS

| | | | |
|---|---|---|---|
| 3,922,517 A | 11/1975 | Nelson et al. | |
| 4,285,458 A | 8/1981 | Slavens | |
| 4,363,954 A | 12/1982 | Rinaldi | |
| 4,556,162 A * | 12/1985 | Gwin | B23K 9/035 228/50 |
| 4,759,981 A * | 7/1988 | Weil | B23K 9/0356 219/160 |
| 5,110,031 A * | 5/1992 | Rinaldi | B23K 37/0531 228/50 |
| 5,361,972 A * | 11/1994 | Barker | B23K 9/32 228/219 |
| 5,395,142 A * | 3/1995 | Horn | B23K 9/0358 228/50 |
| 6,398,100 B1 * | 6/2002 | Radbourne | B23K 37/0531 228/44.5 |
| 2001/0017292 A1 | 8/2001 | Belloni et al. | |
| 2007/0170023 A1 * | 7/2007 | Yamamoto | F16D 65/092 188/250 G |
| 2008/0277921 A1 * | 11/2008 | Ohngren | C10G 9/20 285/24 |

FOREIGN PATENT DOCUMENTS

| | | |
|---|---|---|
| GB | 2249983 A | 5/1992 |
| GB | 2446380 A | 8/2008 |
| JP | S6431599 A | 2/1989 |

OTHER PUBLICATIONS

International Search Report (PCT/ISA/210) dated Apr. 12, 2018, by the European Patent Office as the International Searching Authority for International Application No. PCT/EP2018/050893.

Notice of Termination, Application No. GB1700735.2, dated Sep. 25, 2018.

Written Opinion (PCT/ISA/237) dated Apr. 12, 2018, by the European Patent Office as the International Searching Authority for International Application No. PCT/EP2018/050893.

\* cited by examiner

WELDING SUPPORT BLOCK

FIELD OF THE INVENTION

The present invention relates to a welding support block for pipe welding, particularly but not necessarily, for use when performing a circumferential welding process for joining together sections of pipe when laying an oil and/or gas pipeline.

BACKGROUND OF THE INVENTION

Oil/gas pipelines are typically formed from sections of steel pipe that are welded together using weld filler material of a compatible type. During the welding process, especially during the first weld pass (the root weld pass), it is often desirable to use one or more back support pads (sometimes referred to as a welding shoe) to support the weld pool. The back support pads provide support from inside the pipe and are shaped to fit the curvature of the pipe sections being welded together. Typically the back support pads are incorporated into an internal line-up clamp used to line-up and hold the pipes in position ready for being welded together.

U.S. Pat. No. 4,363,954 describes a back support device for pipe welding. The back support device comprises a set of trapezoidal solid copper pads disposed to form a ring around the internal diameter of a pipe. The copper pads are constantly pressed against the interior surface of the pipe by radial thrust springs. The use of copper as the main bulk material of the back support pads is because copper has a high thermal conductivity, which is desirable as it reduces the risk of the pad itself being melted during the welding process, since heat is quickly and efficiently conducted away. It is important that the copper is not melted because contamination of the weld pool with copper would adversely affect the quality of the weld. Copper deposits in a weld joint can lead to localised hardening, which may in turn lead to an increase in the crack susceptibility of the material in the presence of hydrogen and a the risk of failure of the weld. Further there may additionally/alternatively be copper segregation at the grain boundaries which may increase the risk of crack formation/propagation. The risks of pipeline failure are further increased when the pipeline being laid will carry a product deemed to be 'sour' where the $H_2S$ content is found to be above a defined level (for further information see NACE International Standard MR0175-2002, "Sulfide Stress Cracking Resistant Metallic Materials for Oilfield Equipment"). It is particularly important therefore that welds for pipelines operating under sour services conditions have a hardness below a defined limit and are free from copper inclusions. Welding onto copper backing shoes during the root pass, where there is exposure to the extreme temperatures of a welding arc, carries a high risk of copper pick-up in the weld. Such risks need to be carefully considered and managed if using copper backing shoes when root pass welding of pipeline that is required to operate under sour service conditions.

Alternatives to copper pads have been proposed in the prior art. For example, GB2249983 describes a weld support backing ring comprising a crown of ring pieces that include blocks of ceramic material which directly support the weld region. The use of ceramic material in this way is not without its disadvantages. The ceramic material has a high degree of resistance to high temperature but also tends to suffer from a low resistance to thermal shock causing a breakdown and spalling of the ceramic material when exposed to the welding arc from the root pass. Furthermore, ceramic materials exhibit high heat insulation properties; thus, whereas copper support pads assist with removing heat from the weld region and therefore assist with cooling of the weld pool, a ceramic support block (having very low thermal conductivity) provides no such assistance, which has the effect that welding defects such as porosity have a tendency to be induced in the weld. Also, the production of solid ceramic pads having a shape that accurately fits the curvature of the inside of the pipe is extremely difficult and expensive compared to a copper support pad—notwithstanding the issues mentioned above.

It has also been proposed to use copper support blocks that include a layer of ceramic material, for example as disclosed in U.S. Pat. Nos. 3,922,517 and 4,285,458. The use of copper blocks assists with heat conduction and heat management, whereas the use of a layer of ceramic material reduces the risk of copper contamination in the finished weld. The layer of ceramic material needs to be thick enough that it does not significantly detract from the heat conduction properties provided by the copper underneath. However, when the ceramic is relatively thin it is easily damaged when exposed directly to the welding arc. There is a risk, for example, of ceramic being removed from the backing shoe and adhering itself to the back of the weld whenever the welding arc breaks through the molten pool as it passes over the surface. Once the ceramic is removed it can no longer form a barrier from the copper underneath. Consequently further welds made with such damaged shoes have again the potential of being exposed directly to copper with the potential for pick-up in the weld. The welding process may be modified by reducing the heat intensity of the arc to minimise such damage occurring but it is the case that once the underlying copper is exposed, there exists a risk of copper pick-up in the weld when the shoe continues to be subsequently re-used. Replacement of the ceramic coated copper backing shoe every time a small amount of damage occurs is both expensive and time consuming. If the ceramic layer has been compromised to the extent that the copper is exposed, it may be the case that the welding operator will need either (a) to show (prove) that the welds made since the last time the ceramic layer was known to be intact have not been contaminated with copper or (b) to cut-out and then re-weld the weld joints affected. Increasing the thickness of the ceramic layer would alleviate the problem but would reduce the heat conduction and heat management properties of the support blocks. In practice, the solution is to inspect and/or renew the copper blocks on a regular basis, which adds to welding time, maintenance time and to overall cost. An alternative solution used when laying "sour service" pipelines is simply not to use any weld support block, but as mentioned above, this slows down production rates.

The present invention seeks to mitigate or overcome at least one of the above-mentioned problems. Alternatively or additionally, the present invention seeks to provide an improved welding support apparatus and/or an improved method of welding.

SUMMARY OF THE INVENTION

The present invention provides a welding support block for supporting, from the rear surface of a joint to be welded, a weld pool created during the welding process. The welding support block comprises a block of metal and a layer of ceramic material. The layer of ceramic material is arranged so that in use it is positioned between the block of metal and the weld pool. The layer of ceramic material may form an outer layer of the support block. The outer layer ceramic material may thus form a supporting surface for support the weld pool during use. The metal material immediately beneath the ceramic material layer is made of steel. The use of steel material to support a hot weld pool—typically comprising molten steel—is not a natural choice, given that it will have a melting temperature substantially the same as the material being melted by the welding process. The ceramic layer needs to be thick enough to provide a protective layer between the welding pool and the steel. The steel part of the welding support block might otherwise be at risk of melting and/or sticking to the welded joint if a sufficiently large area were directly exposed to the heat of the welding pool. However, the ceramic layer also needs to be thin enough to allow for heat to conduct into the metal block underneath. A ceramic material layer having a thickness of between 0.25 mm and 1.5 mm is both thin enough to allow for heat conduction yet thick enough to provide adequate separation of the weld pool from the steel underneath.

The use of a ceramic-coated steel support block in accordance with certain embodiments of the present invention provides several advantages, despite what might at first glance appear to be unconventional choice of metal for the support block. Unlike the case in the ceramic-coated copper welding supports of the prior art, in the event that the ceramic layer of the welding support block of the present invention is compromised to the extent that the metal underneath is partly exposed, if there is any passing of metal from the welding support block to the weld pool it will be of steel (preferably having a chemical composition similar to the weld material), not of copper, and the weld pool will not be adversely contaminated. If and when the outer layer of ceramic material of a welding support block of the present invention is damaged, it will not necessarily follow therefore that any welding done immediately before will need to be specially inspected for contamination or performed again. There is therefore less of a need to regularly inspect and/or prematurely replace the welding support blocks. Also, welding speeds may be improved with the use of a welding support block in comparison to those types of welding jobs where the use of a copper welding support pad would not have been risked.

The ceramic material layer may have a thickness of 0.4 mm or greater. The ceramic material layer may have a thickness of 1 mm or lower.

The metal material immediately beneath the ceramic material layer is made of steel. It may be that the welding support block comprises a different metal—for example copper—that is provided beneath both the steel material and the ceramic material layer. It is however preferred that substantially the whole block of metal is a block of steel. It is preferred that block of metal is of one piece construction. It may be that block of metal is solid throughout, and has no channels, or air gaps within the body of the block.

It is preferred that the entire rearward face of the ceramic material layer is in direct contact with the steel material. The thickness of the steel material is preferably at least 10 mm, for example at least for all those parts of the block that are, in use, in the region of the joint to be welded. The thickness is measured in a direction perpendicular to the supporting surface outer layer of ceramic material. The thickness of the steel material may be at least 10 mm for all those regions of the steel material that are in contact with the ceramic material layer. The thickness of the welding support block may be more than 25 mm. The length of the welding support block (measure in the direction along the length of the joint to be welded when the welding support block is in use) may be more than 100 mm. The length of the welding support block may be less than 500 mm. The width of the welding support block (measure in the direction perpendicular to both the length and the thickness) may be more than 10 mm. The width of the welding support block may be less than 100 mm. The volume of the welding support block may be between $10^{-5}$ m$^3$ and $10^{-3}$ m$^3$. The volume occupied by the steel of the welding support block may be between $10^{-5}$ m$^3$ and $10^{-3}$ m$^3$.

The steel material may be weldable grade steel, preferably low carbon weldable grade steel. The steel material may have a low equivalent carbon content, for example a CE value of less than 0.5% and preferably less than 0.4%, and optionally less than 0.3%. (The CE value may be calculated as the percentage by weight of carbon plus ⅙ of the combined Mn and Si content, plus ⅕ of the combined Cr, Mo and V content plus 1⁄15 of the combined Cu and Ni content. The steel material may have a carbon content of less than 0.4% by weight, and possibly 0.3% or less.

The ceramic material may comprise aluminium oxide. The ceramic material may comprise titanium oxide. The ceramic material may comprise yttrium oxide. The ceramic material may comprise silicon nitride. The ceramic material may comprise silicon carbide. The ceramic material may comprise boron nitride. The ceramic material may comprise a mixture of any of the ceramics mentioned above, for example ceramic material may be a mixture of aluminium oxide and titanium oxide. The ceramic material may comprise at least 80% by weight of any one of the aforementioned materials. The ceramic material may comprise at least 80% by weight of any combination/mixture of the aforementioned materials.

The ceramic material may be bonded, secured, or otherwise fixed to the steel layer by means of being sprayed, for example by being thermally sprayed, plasma sprayed or flame sprayed. The ceramic material may be fixed to the steel layer by means of a sintering process. The ceramic material may be bonded to the steel layer by a bonding layer, for example having been applied by thermal spraying. The ceramic material may be fixed to the steel layer by means of being reaction bonded to the steel. The ceramic material layer may include a bond coat that assists in fixing the ceramic material layer to the steel. A suitable bond coat may be a MCrAlY bond coat, for example. The thickness of the bonding layer/bond coat may be less than 0.1 mm.

The welding support block may be configured for use in a method of welding pipes together, for example when laying an oil/gas pipeline. The welding support block may be configured and arranged so as to support the weld pool from outside the pipe. In such a case, it will be appreciated that the welding support block may be arranged to allow welding from inside the pipe, the rear surface of the weld joint thus being at the outer circumference of the pipe. Alternatively, and as described below in relation to the illustrated embodiments, the welding support block may be configured and arranged so as to support the weld pool from inside the pipe. The supporting surface of the support block may have a curved surface. Such a curved surface may have a constant radius of curvature, so that may fit against the surface of a pipe during use. The supporting surface of the support block may be convex, for example so that the welding support block is configured for supporting a weld pool from within the interior of a pipe. The welding support block may be so shaped to support a surface of a pipe joint, wherein the surface so supported extends only part way around the circumference of the pipe. It may be a single welding support block extends 60 degrees or less around the circumference of the pipe. The welding support block may have a generally trapezoidal shape.

The welding support block may form part of a larger apparatus, for example comprising multiple welding support blocks. The or each welding support block may be movable, relative to the apparatus, to and from a position in which it supports the weld joint. The general shape and configuration of the welding support block(s) may be substantially the same as the trapezoidal copper pads disclosed in U.S. Pat. No. 4,363,954 or in the corresponding UK patent application (GB 2 067 945A). The contents of those publications are fully incorporated herein by reference. The welding support block of the present invention may incorporate any of the features disclosed in those patent publications. In particular, the claims of the present application may be amended to include the feature of the apparatus which moves and holds the welding support block(s) when welding together pipes. For example, the welding support block of the present invention may be associated with a spring system like that disclosed in U.S. Pat. No. 4,363,954 to urge the welding support block against the surface of the pipes.

The present invention also provides an internal line-up clamp for holding two pipes in alignment so that the pipes may be welded together, wherein the clamp includes a plurality of welding support blocks as described or claimed herein.

There is also provided a method of welding together two workpieces, for example two pipes, using one or more support blocks as described or claimed herein. Such a method may comprise a step of arranging two pipes end to end so as to define a circumferential weld line. There may then be a step of welding along the weld line to form a weld joint. During the welding step, the weld joint/weld pool is supported with one or more support blocks of the present invention, for example with the support blocks supporting the weld joint from inside the pipes. One of the two pipes may be in the form of the end of a pipeline that is being laid. One of the two pipes may be in the form of a separate pipe section. The two pipes may have bevelled ends such that when arranged end to end a circumferential groove is formed, in which weld material may be deposited when welding together the two pipes.

The step of welding may include providing at least one welding torch for welding, from outside the pipe, the circumferential groove. There may be multiple welding torches. The method may utilise a plurality or torches, which are operated simultaneously. The step of welding may use a gas metal arc welding (GMAW) process, for example a metal inert gas (MIG) welding or a metal active gas (MAG) welding process. The step of welding may use a gas tungsten arc welding (GTAW) process, such as a Tungsten inert gas (TIG) welding process. The step of welding may use a plasma arc welding process. The method may include a step of urging the welding support blocks against the rear surface of the joint to be welded.

The method may be performed when laying a pipeline, for example an underwater pipeline. The method may be performed when laying a deep-sea pipeline, for example at depths of greater than 1,000 m. The pipeline may be a gas and/or oil pipeline. The pipeline may be a pipeline for carrying sour services. The method may include bevelling the ends of the pipe sections to be welded.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Various embodiments of the invention will now be described, by way of example only, with reference to the accompanying schematic drawings of which.

DETAILED DESCRIPTION

Figure 1:
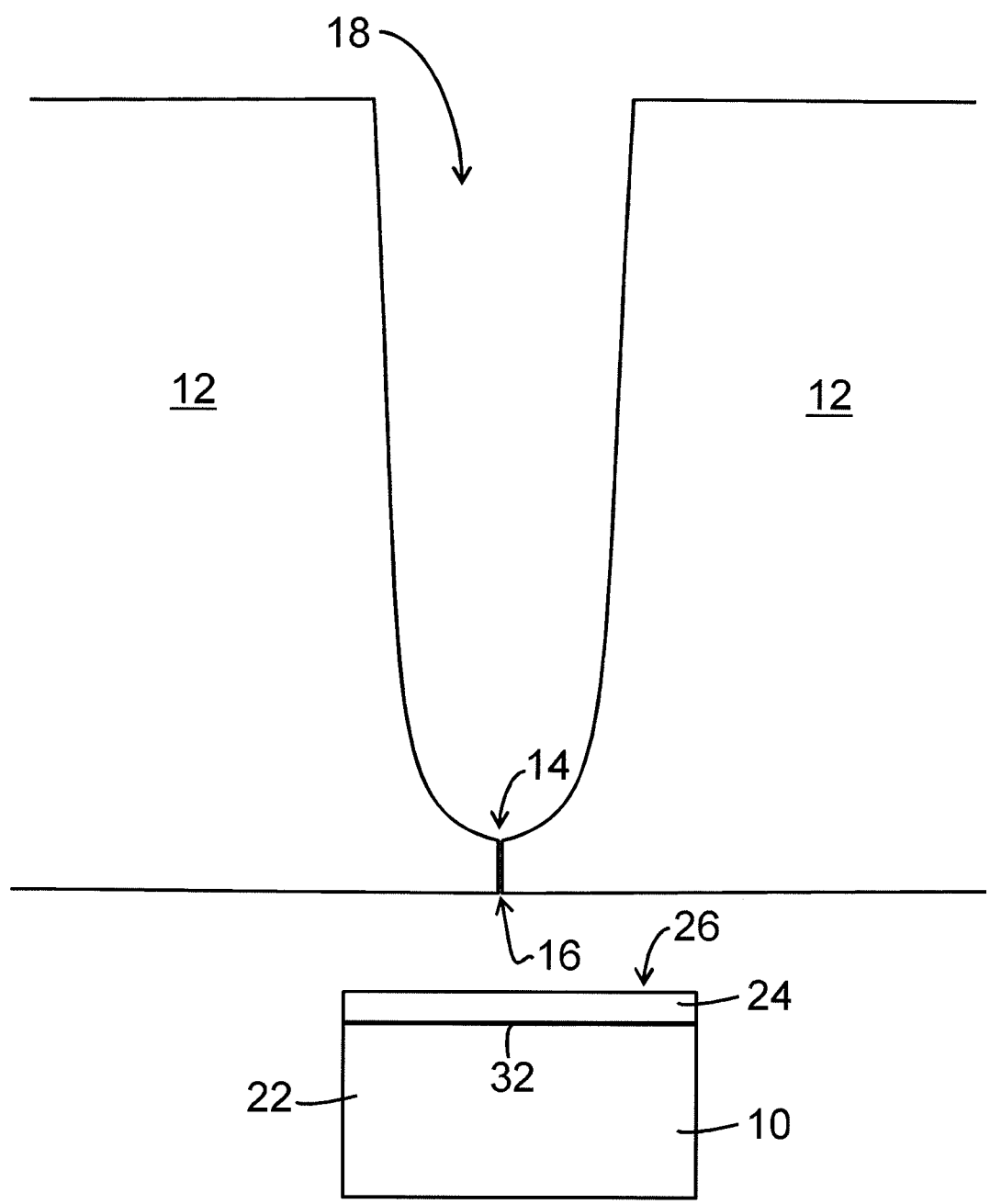
FIGS. 1 and 2 show, in cross-section, a welding support block in use according to a first embodiment of the invention.

FIG. 1 shows a welding support block 10 according to a first embodiment of the invention for supporting a joint 14 from the rear surface 16 of the joint. In this case, the joint to be welded is between two bevelled pipes 12, which are shown in FIG. 1 arranged end-to-end, so that a circumferential groove 18 is defined. The welding support block comprises a block of steel 22 and an outer layer of ceramic material 24, which provides the weld support surface 26. The steel is low carbon weldable grade steel having an effective carbon content (CE) of 0.2%. The outer layer of ceramic material 24 is deposited on the steel by means of plasma-spraying a coating of aluminium oxide/titanium oxide (85%/15%, by weight) onto the steel, after a bond coat 32 of MCrAlY has been applied (also by thermal spraying).

Figure 2:
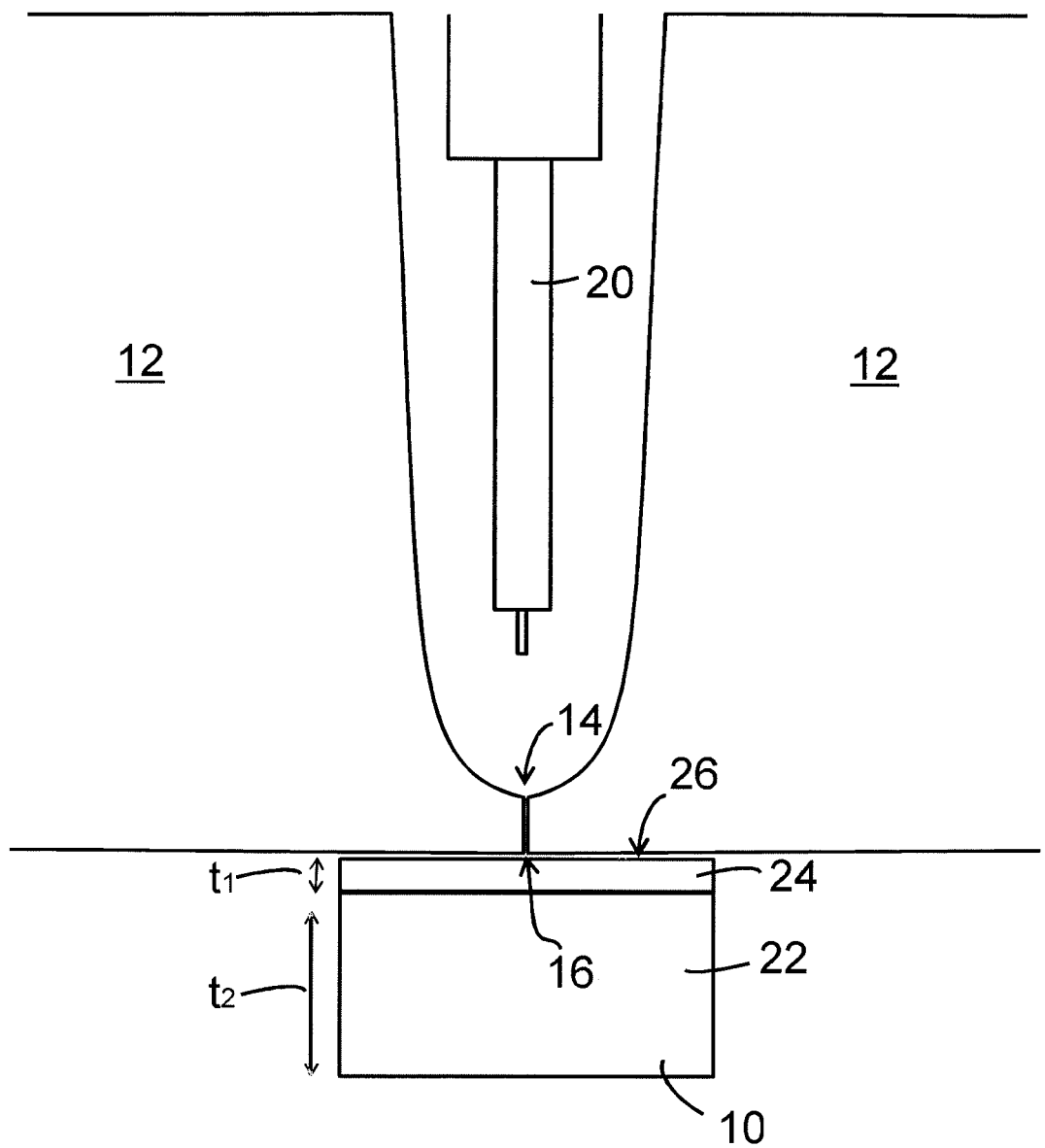
Figure 3:
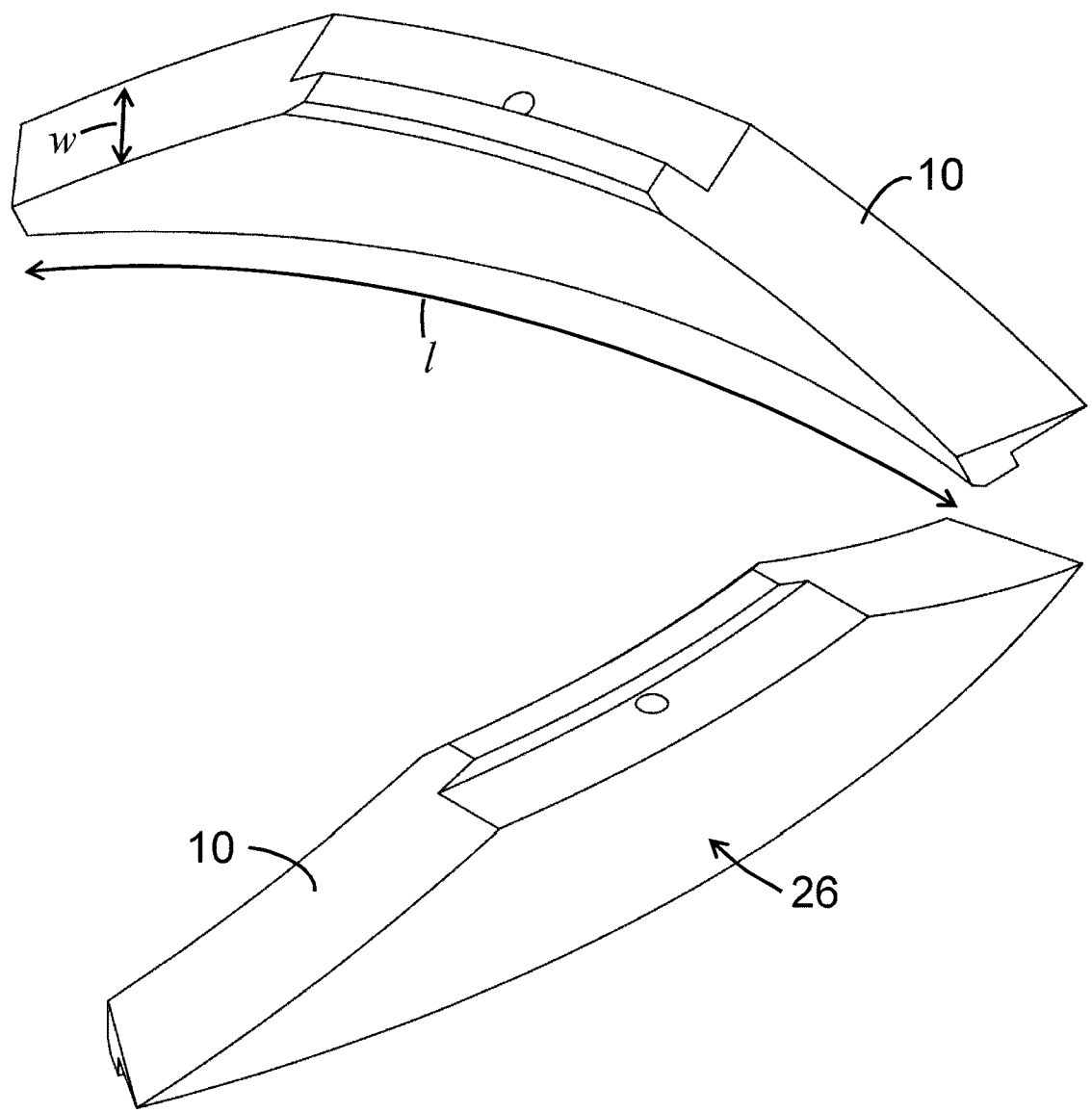
FIG. 3 shows two views, in perspective, of a welding support block of the first embodiment of the invention.

FIG. 2 shows the welding support block 10 in place during welding. In use, the upper surface 26 provided by the ceramic layer is urged towards, contacts and supports the rear surface 16 of the weld joint 14, while twin GMAW welding torches 20 (only one of which is shown in FIG. 2) are used to perform the welding of the joint. The ceramic material layer has a thickness $t_1$ of 0.4 mm, whereas the steel layer has a thickness $t_2$ of about 40 mm. The thickness of the bond layer (see layer 32 in FIG. 1) between the ceramic material layer and the steel layer is about 0.05 mm. The shape of the welding support block 10 is shown in FIG. 3. It has a trapezium-shaped cross-section to facilitate multiple blocks to be used together as described in further detail below. The upper surface 26 provided by the ceramic layer is convex and curved with a constant radius of curvature so as to fit against the interior surface of a pipe joint (in this case, the radius of curvature being just under 300 mm—making the block suitable for use on the interior of 24" diameter pipes). The width of the block is about 20 mm and the length along the base is about 240 mm. The volume of a single block is of the order of $10^{-4}$ m$^3$.

The welding support blocks according to the first embodiment of the invention are particularly suited for use in a high production-rate method of welding together pipelines for carrying so-called sour services. High production rates typically require strong/high-intensity welding processes for example using multiple GMAW torches simultaneously. Particularly during the first weld pass, the use of a welding support block according to the first embodiment as a back pad to support the weld pool allows the welding process to be faster, than would be the case without supporting the weld pool at all. Also, the use of a welding support block according to the first embodiment precludes the risk of contamination with copper, in comparison to the copper pads traditionally proposed. By way of further explanation, copper has previously been considered as being the appropriate material for the bulk material of a weld support pad. As compared to steel for example, the high thermal conductivity of a copper pad makes it difficult to melt the pad, since the heat is efficiently conducted away before the pad reaching the melting temperate of the copper material. (During use, the weld pool may reach temperatures of around 1400° C. or greater and may, or may not, be sufficiently molten that there is a risk of fall-through if the weld pool were not adequately supported). While the copper rarely reaches melting temperature there is a risk, particularly when exposed directly to a high temperature welding arc on the first weld pass, of a small amount of copper being melted and detaching from the pad and transferred into the weld pool. If this happens there is potential for a small amount of copper segregation at the grain boundaries of the weld so formed, with an increased risk of cracking. Furthermore, the higher rate of cooling of the weld may cause an undesirable increase in hardness in the welded material, possibly higher than permitted in certain client's specifications of desired weld hardness, as might for example be specified for gas pipelines for transporting products with high levels of hydrogen/$H_2S$ gas (sour services). Previously considered solutions for avoiding copper contamination when welding together pipes to form a sour service gas pipeline have included (a) not using weld support pads at all but using a slower welding process on the root weld, (b) using copper pads but with a less intensive and therefore slower welding process, or (c) using ceramic coated copper pads. The last of these proposals offers the possibility for the fastest production rates, of the three, but has in practice been found to give rise to difficulties. Even though the copper shoes are coated with a ceramic layer, partial fusion between the root weld and the copper shoe can still occur, causing unacceptable risks contamination with copper. An obvious solution to this problem might be to increase the thickness of the ceramic coating, but there are limits to have thick the coating can be made in practice, because the ceramic layer needs to be thin enough—less than 1,500 microns—for the purposes of allowing sufficient heat to pass into the copper underneath. Selecting a very thick ceramic layer that protects against the risk of damage by the welding arc would add too much thermal insulation between the copper and the weld pool. Thus, when using ceramic-coated copper shoes, it may therefore be necessary to weld with a soft and gentle welding arc (essentially a low current) and routinely inspect (i.e. after every weld for damage to the ceramic layer) and replace shoes if any when any damage is revealed which exposes or is close to exposing the copper material beneath.

It will be seen that the use of thick steel welding support blocks with a thin ceramic coating layer provides several useful advantages compared to ceramic-coated copper shoes, despite using a metal (steel) in the welding support block that has a melting point comparable to that of the pipe and weld material of the weld joint being formed, and despite the thermal conductivity of steel (tens—around 50—of $Wm^{-1}K^{-1}$) being significantly lower than compared to copper (hundreds—around 390—of $Wm^{-1}K^{-1}$). The ceramic layer, used in the present embodiment, although relatively thin, can provide sufficient insulation that the rate of heat transfer into the welding support block is not sufficient to melt the steel and can instead be managed appropriately. By using steel, not copper, there may be no risk of cracking due to copper pick up in the weld. The present embodiment may also (a) allow for increased tolerances within welding parameters when performing the root weld pass, (b) enable an increased level of productivity due to weld support, cooling and thermal conductivity of the steel compared to the case when welding without any weld backing shoes, (c) enable reduced thermal cooling of the welding pass due to the thermal insulation of the ceramic and steel combination compared to copper backing shoes, and (d) importantly reduce the frequency of pad replacement/inspection as compared to a ceramic coated copper shoes.

Figure 4:
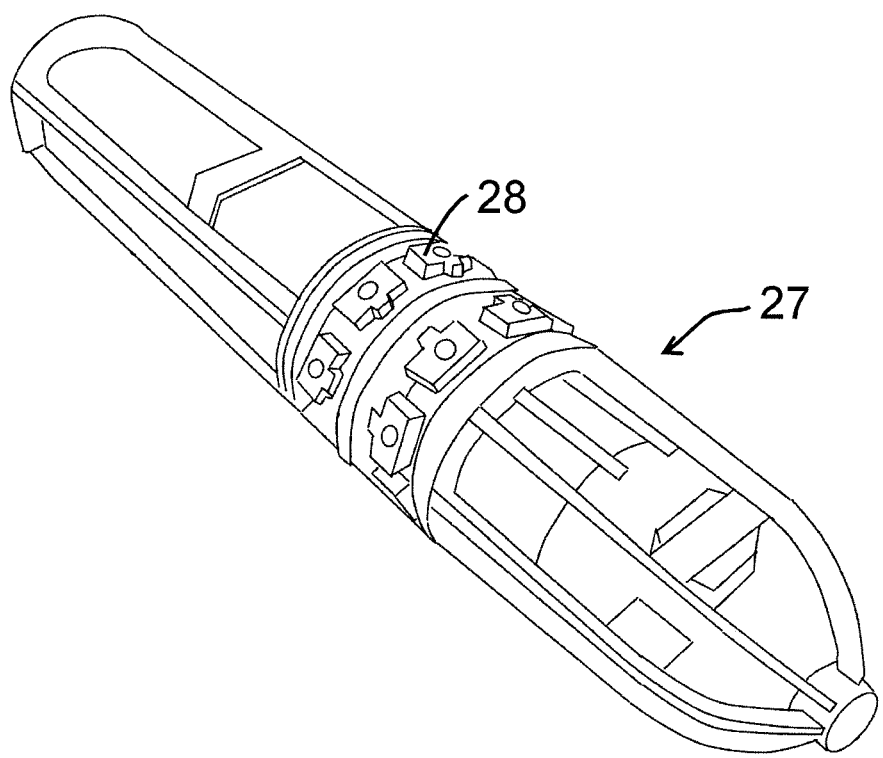
FIG. 4 shows, in accordance with a second embodiment, an internal line-up clamp.
Figure 5:
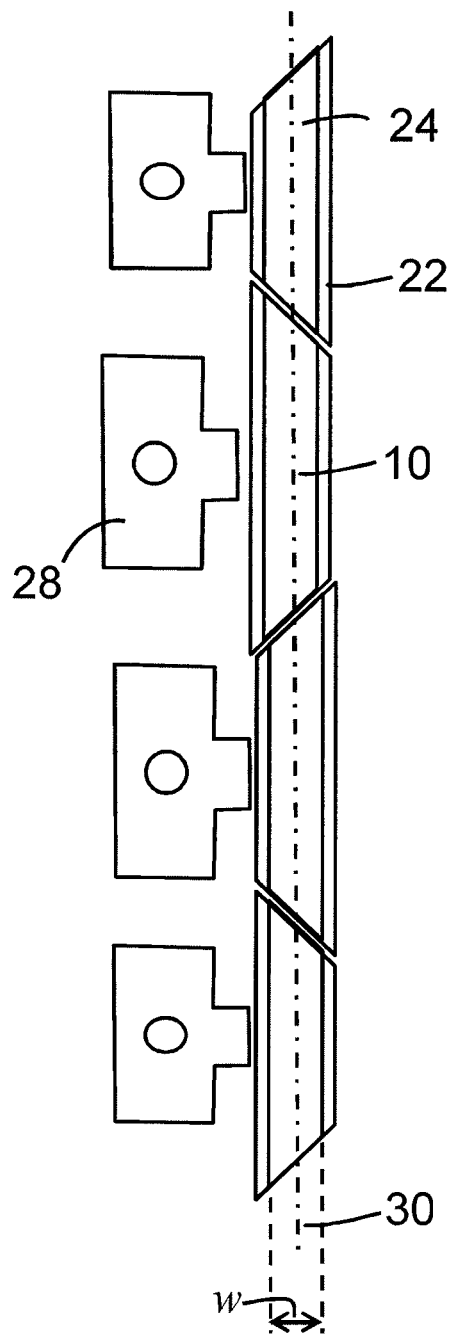
FIG. 5 shows a portion of the apparatus shown in FIG. 4.

FIG. 4 shows, in accordance with a second embodiment, an internal line-up clamp ("ILUC") 27. The ILUC 27 has two sets of multiple clamping members 28, each set forming a ring of clamping members 28 around the circumference of the ILUC. Multiple welding blocks 10 (not shown separately in FIG. 4)—or "shoes"—are arranged in a ring around the ILUC in between the two rings of clamping members 28. FIG. 5 shows schematically a partial side-view looking at a single ring of the multiple clamping members 28 and also shows the trapezium-shaped welding blocks 10 arranged alongside the ring of clamping members 28. In use, the trapezium-shaped welding blocks 10 are positioned in alignment with the centre-line 30 of the circumferential groove to be welded. Thus, in use one set of clamping members 28 is arranged to one side of the welding joint/line and the other set is arranged on the opposite side, so that the two sets together, when actuated, hold in alignment the two pipe sections either side of the joint to be formed. The welding support blocks 10 are each pressed against the interior of the pipe joint by radial thrust springs (not shown). The general structure and arrangement of the clamping members, welding blocks, and the radial thrust springs are similar to the clamping members ("radial pistons"), welding blocks ("pads") and the radial thrust springs described and illustrated in U.S. Pat. No. 4,363,954, and so are not described in further detail here. The principal difference is that the welding support blocks 10 are formed of steel and coated with an outer layer 24 of ceramic material for supporting the weld pool, in use.

It will be seen, in this second embodiment, that the outer layer 24 of ceramic material providing the supporting surface for the weld pool, has a width w that is less than the width of the steel part 22 of the support block. It may also be the case that a small amount of the steel part 22 is left uncovered by ceramic material at the mating edges between adjacent welding blocks 10, to reduce the chance of the ceramic material getting damaged by the mechanical action of the welding blocks 10 rubbing together by the expansion and retraction process. The gaps that exist between the areas of ceramic material are ideally kept to a minimum, so that any such gaps are small and do not result in excessive melting of the steel of the welding blocks 10. Also, the welding blocks 10 in this case are in the form of a base structure pad of steel having a thickness of about 25 mm and a 600-micron-thick skin of ceramic material which forms the outer layer 24 for contacting and supporting the pipe joint.

Figure 6:
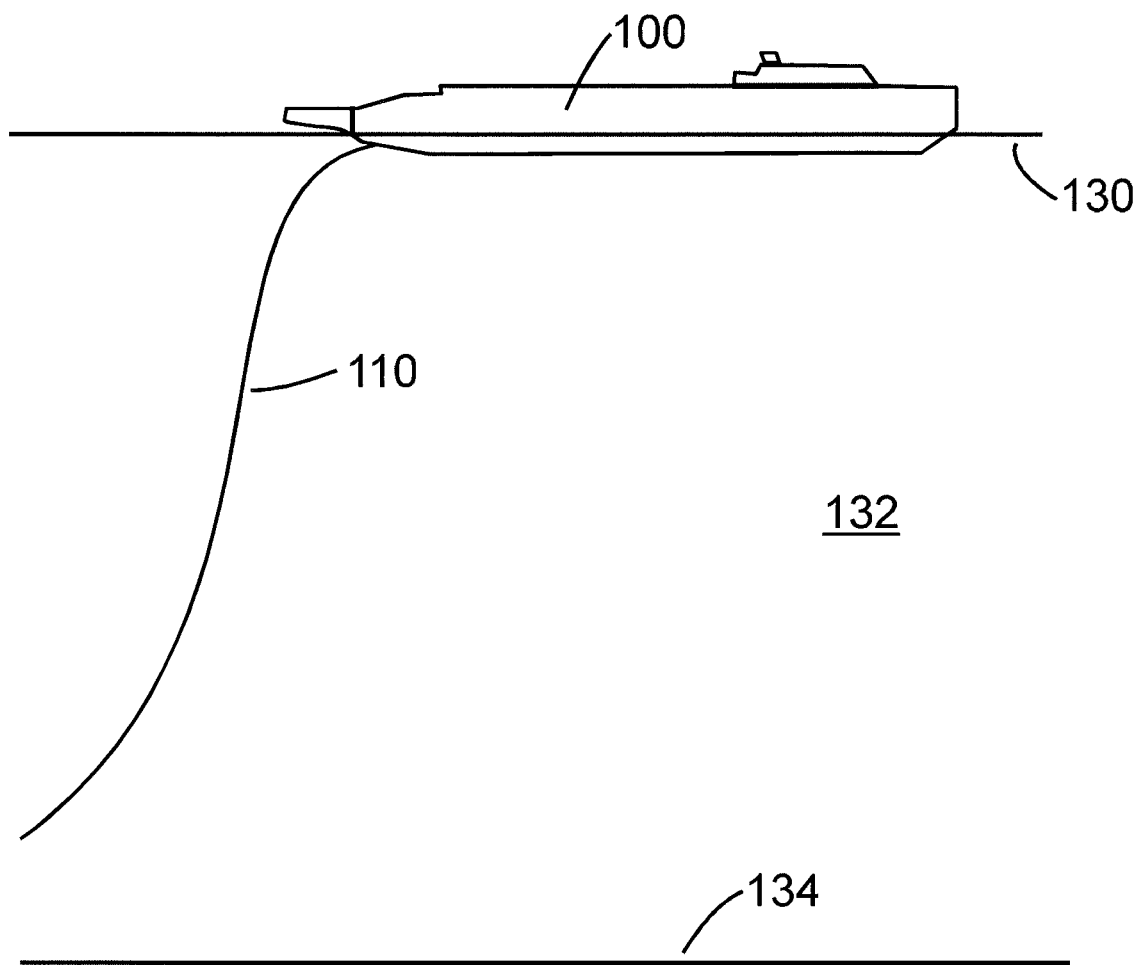
FIG. 6 shows vessel laying an underwater pipeline according to a third embodiment of the invention.

FIG. 6 shows a third embodiment of the invention which concerns a method of laying an underwater pipeline for carrying sour services from a floating vessel 100, for example at sea 132. Pipe lengths are welded to the end of the pipeline 110 on board the vessel, above sea-level 130, utilising the welding support blocks of the first embodiment.

The ends of the pipes are bevelled so that when a new length of pipe is arranged end-to-end with the free end of the pipeline 110 held on the vessel 100 a circumferential groove is formed. Multiple GMAW welding torches simultaneously weld along the circumferential groove, depositing weld material in the groove, to form a weld joint. During the step of forming the root weld, the weld pool so formed, is supported by one of more the support blocks. Each such support block may be as described above in relation to the first or second embodiments. The pipeline will typically extend to/from the sea-bed 134. The laying process may be in S-lay mode, J-lay mode or any other suitable pipe-laying mode.

Figure 7:
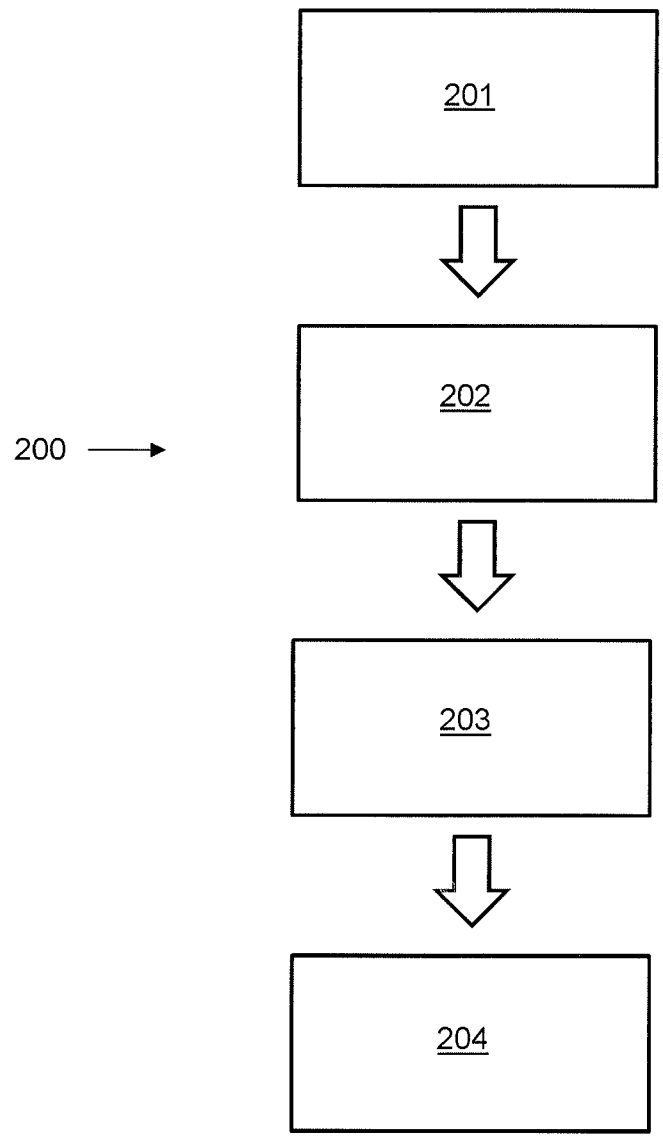
FIG. 7 is a flow-chart illustrating the steps of a method of welding together two pipes according to a fourth embodiment of the invention.

FIG. 7 shows a fourth embodiment of the invention which concerns a method 200 of welding together two pipes. There is a first step 201 of providing an apparatus on which are provided multiple welding support blocks in accordance with the first embodiment. As a second step 202, the two pipes are arranged end to end so as to define a circumferential weld line. The third step 203 involves moving the multiple welding support blocks and associated apparatus into a position, inside the pipes, ready for supporting the weld region by means of the ceramic support surfaces of the welding support blocks. The fourth step 204 comprises using welding torches to form a weld along the weld line to form a weld joint. During the welding step 204, the weld joint is supported using the support blocks.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

There may be more or fewer clamping members/welding blocks around the circumference of the ILUC. There may be twelve for example in each ring. In such a case, each welding block would extend about 30 degrees around the circumference of the ILUC.

The welding support blocks may be used on other weld joints, for example when welding together workpieces not being in the form of pipes.

The metal in the support block need not be all steel. Other types of ceramic material may be used. There may use of the support blocks in a case where the support block provides support other than directly adjacent to a molten weld pool.

Other types of welding processes may utilise welding support blocks, such as plasma welding, or gas tungsten arc welding (GTAW), for example.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An internal line-up clamp for holding two pipes in alignment so that the pipes may be welded together, the clamp comprises:

a plurality of welding support blocks, each welding support block being configured to support, from the rear surface of a joint to be welded, a weld pool created during the welding process, each of the welding support blocks comprises a block of metal and a layer of ceramic material arranged to provide thermal insulation between the block of metal and the weld pool, the block of metal comprising metal material immediately beneath the layer of ceramic material, wherein:

the layer of ceramic material has a thickness between 0.25 mm and 1.5 mm, and the metal material immediately beneath the layer of ceramic material is made of steel.

2. The internal line-up clamp according to claim 1, wherein the block of metal is a block of steel.

3. The internal line-up clamp according to claim 1, wherein the thickness of the steel is at least 10 mm.

4. The internal line-up clamp according to claim 1, wherein the steel is a low carbon weldable grade steel.

5. The internal line-up clamp according to claim 1, wherein the ceramic material is one of the group consisting of (a) aluminium oxide, (b) titanium oxide (c) yttrium oxide, (d) silicon nitride (e) silicon carbide, (f) boron nitride, (g) a mixture of aluminium oxide and titanium oxide, and (h) a mixture comprising at least 80% by weight of one or more of the other ceramic materials of this group.

6. The internal line-up clamp according to claim 1, wherein the ceramic material is bonded to the metal material immediately beneath by a bonding layer.

7. The internal line-up clamp according to claim 1, wherein the welding support block further comprises a supporting surface, wherein the supporting surface has a curved surface, with a constant radius of curvature, configured for fitting against the surface of a pipe during use.

8. The internal line-up clamp according to claim 7, wherein the supporting surface of the support block is convex so that the welding support block is configured for supporting a weld pool from within the interior of a pipe when performing a weld on the pipe from the exterior.

9. A method of welding together two pipes comprising the steps of arranging the two pipes end to end so as to define a circumferential weld line, using an internal line-up clamp to hold the two pipes in alignment, the internal line-up clamp including a plurality of welding support blocks, each welding support block comprising a block of metal and a layer of ceramic material, the block of metal comprising a steel region immediately beneath the ceramic material layer, the ceramic material layer having a thickness between 0.25 mm and 1.5 mm, welding along the weld line to form a weld joint thereby creating a weld pool, and during the welding step, supporting the pipes in position with the internal line-up clamp from inside the pipes with each welding support block supporting, from the rear surface of the weld joint, the weld pool with the layer of ceramic material providing thermal insulation between the block of metal and the weld pool.

10. The method according to claim 9, wherein the step of welding uses one of a gas metal arc welding (GMAW) process, a gas tungsten arc welding (GTAW) process, and a plasma arc welding process.

11. A method of laying a pipeline, the pipeline being at least one of a pipeline for carrying sour services and an underwater pipeline, wherein the method includes joining together pipe sections to form the pipeline using the method of claim 9.

12. The internal line-up clamp according to claim 7, wherein the supporting surface extends only part way around the circumference of the pipe.

13. The internal line-up clamp according to claim 8, wherein the supporting surface extends only part way around the circumference of the pipe.

14. The internal line-up clamp according to claim 1, wherein each welding support block extends 60 degrees or less around the circumference of the pipe.

15. An apparatus for supporting a weld pool from within the interior of a pipe during a method of welding, the apparatus comprising an internal line-up clamp including a plurality of welding support blocks, which together are configurable to provide a convex supporting surface for supporting the weld pool; each of the plurality of welding support blocks comprising:

a block of low carbon weldable grade steel having a thickness of at least 10 mm; and a layer of ceramic material having a thickness between 0.25 mm and 1.5 mm arranged to provide thermal insulation between the block of low carbon weldable grade steel and the weld pool.

16. The apparatus according to claim 15, wherein the ceramic material is one of the group consisting of (a) aluminium oxide, (b) titanium oxide (c) yttrium oxide, (d) silicon nitride (e) silicon carbide, (f) boron nitride, (g) a mixture of aluminium oxide and titanium oxide, and (h) a mixture comprising at least 80% by weight of one or more of the other ceramic materials of this group.

17. The apparatus according to claim 15, wherein the welding support blocks when configured to provide the convex supporting surface define at least part of a circumference and each welding support block has a curvature which extends 60 degrees or less around the circumference.

* * * * *